Aug. 25, 1964    I. V. DINKOV ETAL    3,145,647
CART FILLING AND BALING MACHINE
Filed May 7, 1962    2 Sheets-Sheet 1

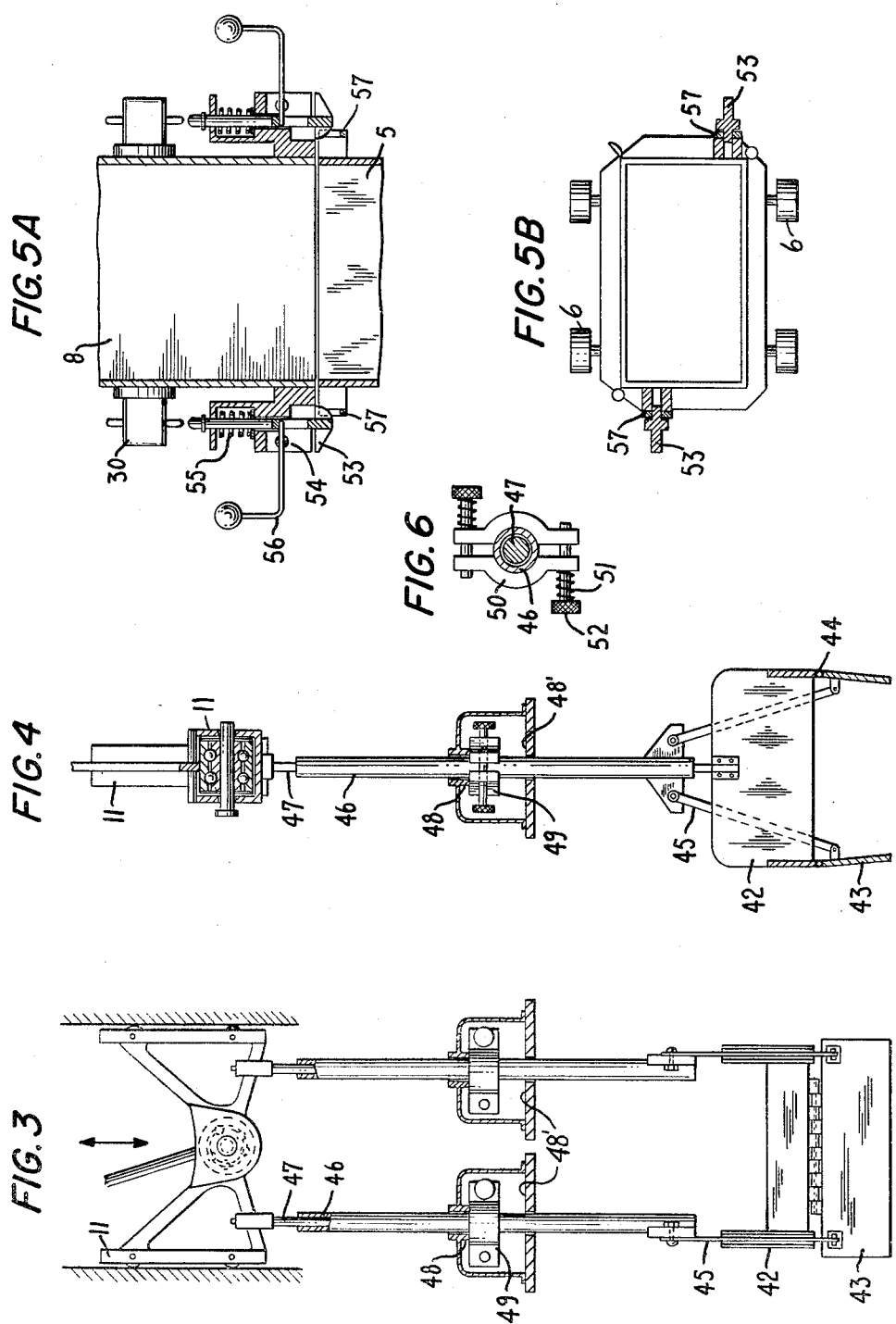

United States Patent Office 3,145,647
Patented Aug. 25, 1964

3,145,647
CART FILLING AND BALING MACHINE
Ivan V. Dinkov, Stanke Dimitrov, Pencho C. Russev, Plovdiv, and Stephan I. Stephanov and Konstantin N. Nitchev, Sofia, Bulgaria, assignors to Bulgartabac, State commercial enterprise, Sofia, Bulgaria
Filed May 7, 1962, Ser. No. 192,927
6 Claims. (Cl. 100—53)

The invention relates to apparatus for baling leaves.

Leaves are either baled by hand or by machines. As presently practiced, both present disadvantages. Manual baling is time consuming and deleterious to the health of the balers. The present baling machines are too large, heavy and mechanically complex, and they produce bales having soft spots, where leaves are not equally compressed, and that vary in size and weight with the physical characteristics of the baled leaves.

An object of the invention is to provide improved apparatus for forming homogeneous bales of leaves.

Another object of the invention is to provide apparatus for baling leaves of differing physical characteristics in bales of the same size and weight.

Another object of the invention is to provide improved apparatus for baling leaves that are comparatively small and light and can be mounted in low leaf-storage buildings, such as tobacco sheds.

Other objects and a fuller understanding of the invention may be had by referring to the following description and claims, taken in conjunction with the accompanying drawing, in which:

FIG. 3 is an enlarged side elevation of the pressing mechanism illustrated in FIG. 1;

FIG. 4 is a front elevation of the matter illustrated in FIG. 3;

FIGS. 5A and 5B are enlarged side and plan views, respectively, in vertical and horizontal cross-section respectively of locking apparatus illustrated in FIG. 1, and FIG. 6 is an enlarged horizontal cross-section of a braking device illustrated in FIG. 1.

Figure 1:
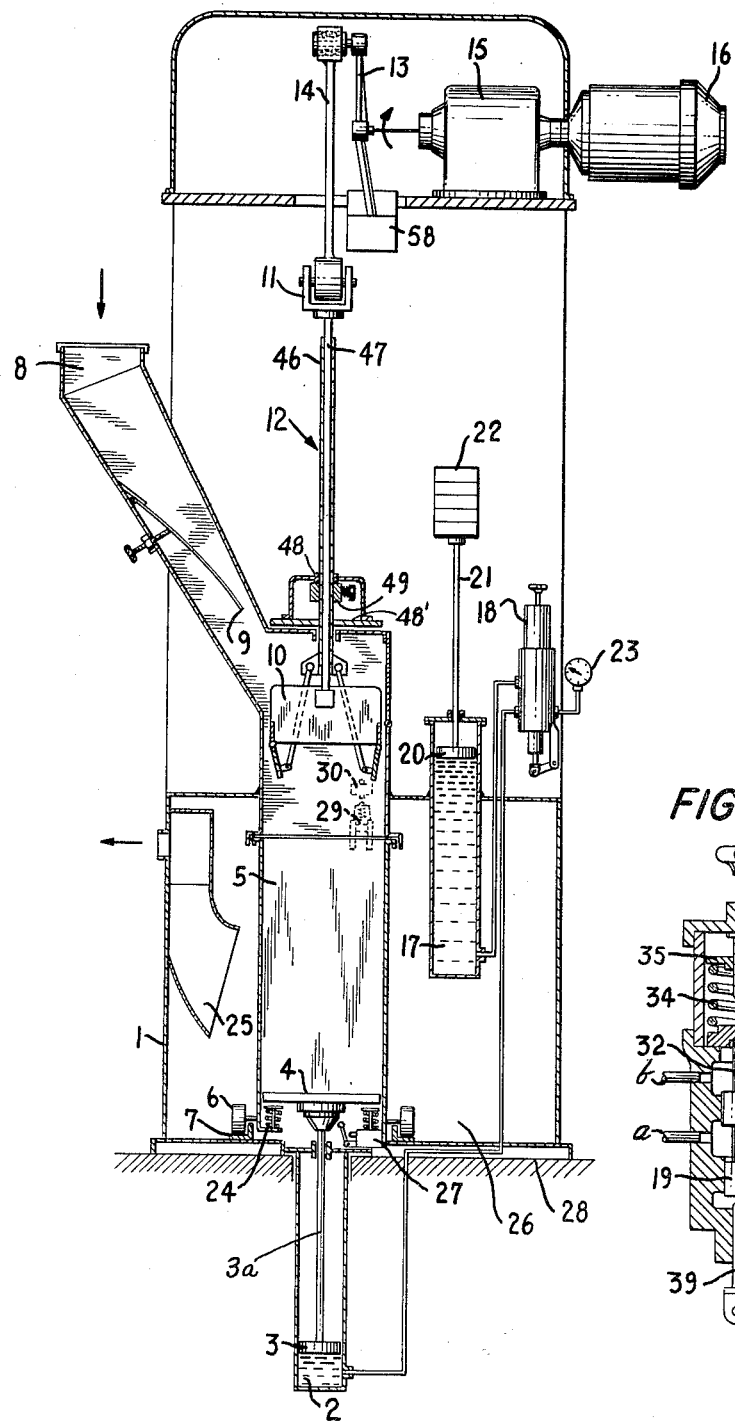
FIG. 1 is a front elevation in vertical cross-section of a leaf baling machine according to the invention.

Referring to FIG. 1 the leaf baling machine, preferably for use with tobacco leaves, comprises a frame 1, in the lower part of which is attached a lower hydraulic cylinder 2. A piston 3 is slidably mounted in the hydraulic cylinder 2 and is connected by a rod 3a to a movable bottom 4 in a cart 5 in which leaves are fed and pressed. The bottom 4 is vertically movable in the cart 5 between upper empty positions to a lower full position in the cart. Springs 24 are mounted in the base of the cart 5, under the movable bottom 4. The cart 5 is equipped with wheels 6 and enters the machine by running over rails 7. The cart 5 is positioned under the lower end of a chute 8 through which leaves are fed and that is equipped with a regulating flap valve 9 for spreading the leaves spread uniformly in the cart. A pressing piston 10 for periodically pressing the leaves in the cart passes through the lower vertical end of the chute 8 and is connected with a crosshead 11 by means of piston rods 12. The piston is reciprocally driven by the crosshead 11 which is connected by a connecting rod 14 to a crank 13 which is mounted on the output shaft of a speed reducer 15 driven by an electrical motor 16.

The lower hydraulic cylinder 2 is connected to an upper hydraulic reservoir cylinder 17 through a valve 18 having a differential piston 19 mounted therein and slidable to respective positions that connect the lower cylinder 2 to upper cylinder 17 when the pressure in lower cylinder 2 is the higher and otherwise disconnects cylinders 2 and 17. However the piston 19 is manually adjustable to connect upper cylinder 17 to lower cylinder 2 when the pressure in upper cylinder 17 is the higher to raise piston 3. The upper hydraulic cylinder 17 is equipped with a piston 20 and a piston rod 21 on which weights 22 are placed. The pressure of the lower hydraulic cylinder 2 is indicated by a pressure gage 23 mounted on the side thereof. The lower portion of the machine is provided with an exhaust pipe 25 for exhausting the dust rising from the leaves as they are pressed. The travel of the piston 3 of the lower hydraulic cylinder 2 is limited by a limit electrical cut-off device 27, mounted on the base 28 of the machine and actuated by the piston rod 3a. Locking devices 29 (see FIG. 1) are mounted at the lower part of the chute 8 for locking the cart 5 to the chute 8. They are situated symmetrically and opposite one another. Switch devices 30 are mounted above the locking devices 29, and each device 30 is operable by an associated unlocked locking device 29 to cut-off the operation of the baling apparatus.

Figure 2:
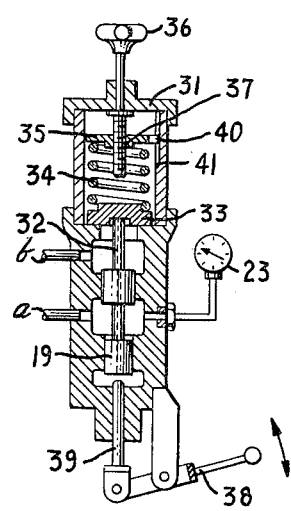
FIG. 2 is an enlarged vertical cross-section of a valve illustrated in FIG. 1.

Referring to FIG. 2 the valve 18 consists of a body 31. Inside the body differential piston 19 is movable axially between an upper position in which cylinders 2 and 17 are connected and a lower position in which the cylinders are disconnected. The upper end 32 of the differential piston 19 contacts a disc 33 biased against upper end 32 by a spring 34. A pressing disc 35 for regulating the pressure of spring 34 is mounted at the other end of the spring and is adjusted with respect to disc 35 by means of a rotatable knob 36 and attached screw engaging a complementarily threaded nut 37. The piston 19 is axially displaceable manually by means of a lever 38 pivoted to a rod 39. The nut 37 carries a pin 40, which moves in a special groove 41 in the body 31 and keeps the nut 37 from turning with the knob 36 when its is rotated for adjusting the pressing disc 35 and the bias of spring 34.

The pressing piston 10, which is shown in two views respectively in FIGS. 3 and 4, comprises a box 42 having two cover flaps 43 attached thereto by hinges 44. Referring to FIGS. 1, 3 and 4, the cover flaps 43 are pivoted to the corresponding ends of rods 45, the other corresponding ends of which are pivoted to the pipes 46. Inside the pipes 46 there are slidably mounted rods 47, which connect the box 42 of the pressing piston 10 to the crosshead 11. The rods 45 pass through the double walls of the box 42. Over the pipes 46, between lower and the upper stoppers 48 and 48′, are mounted braking mechanisms 49 (see FIGS. 1, 3, 4 and 6). Each of these braking mechanisms 49 comprises a pair of brake shoes 50 which are biased against the pipes 46 by springs 51. The bias of the springs 51 are regulated by means of bolts 52 threadingly engaging the shoes 50.

Each of the two locking devices 29 comprises a cross-shaped tongue 53 which is guided into a body 54. The cross-shaped tongue 53 is biased by a spring 55, which presses it downwardly. By means of a lever with a handle 56, the cross-shaped tongue 53 may be raised by hand upwardly. In the upper portion of the cart 5 there are supports 57 for engaging the cross-shaped tongues.

The operation of the leaf baling machine of the present invention is as follows:

An empty cart 5 is introduced into the leaf baling machine, and is locked automatically therein—the front outer wall of the cart initially passing under the cross-shaped tongue 53—and camming a sloping surface thereof to raise the tongue upward. The cross-shaped tongue 53 is biased by the spring 55 back into its original position as the front inner wall passes onward. The back inner wall of the cart 5 again and similarly raises the cross-shaped tongue 53, and after passing under it, the tongue is biased downward along the back outer wall to prevent the cart from returning whence it came. Simultaneously the cross-shaped tongue 53 of the opposite locking device 29, without being raised by the front wall with the introduction of the cart 5 into the tobacco baling machine, is biased into the housing of the opposite support 57 to prevent the cart 5 from moving further forward, thereby locking the cart 5 to the chute 8. The raising of the cross-shaped tongue 53 by the front and back walls of the cart 5 actuates the electrical cut-off device 30 and disconnects the electrical power circuit (not shown) to the machine. Thus if the cart is not properly positioned and locked under the chute 8 the cross-shaped tongue remains raised, cutting off the electrical power circuit and preventing the machine from starting. The electrical cut-off switch acts by a displacement equal to the width of the support 57. The locking tongues 53 are similarly arranged on opposite ends of the cart 5 and are operable with the cart 5 entering the tobacco baling machine from either direction.

After the cart 5 is introduced under the chute 8, the movable bottom 4 is raised to the upper empty container position near the open top of the container. This is accomplished as the fluid from the upper hydraulic cylinder 17, which is under a predetermined low pressure exerted by the weights 22 placed over the piston rod 21 and piston 20, is fed under the piston 3 of the lower hydraulic cylinder 2. The feeding of the fluid is done by means of the valve 18, as the lever 38 is manually pressed downwards and the rod 39 raises upwards the differential piston 19 until the openings a and b (FIG. 1) are connected one with another. After the movable bottom 4 is raised, the lever 38 returns to its original position. Under the pressure of the incoming fluid the piston rod 3a of the hydraulic cylinder 2 presses under the movable bottom 4 of the chart 5 and raises it upward to a height equal to the stroke of the piston that corresponds to the height of the bales.

The electrical motor 16 of the machine is started, driving the speed reducer 15 to turn the crank 13 and reciprocate the connecting rods 14 and 12, the crosshead 11, and the pressing piston 10. The pressing piston 10 in its reciprocation, moves downward with closed cover flaps 43, and upwards with opened cover flaps 43. The opening and the closing of the cover flaps 43 are accomplished by the rods 45, hinged to the pipes 46. The pipes 46 are embraced by the pair of brake shoes 50 of the braking mechanism 49 and provide a relative motion between the pipes 46 and the rods 47. When the pressing piston 10 moves downwardly, the braking mechanisms 49 engage the lower bumper supports 48' and because of the friction between the brake shoes 50 and the embraced pipes 46, the pipes lag in motion relative to the rods 47 and the hinged rods 45 pull up the cover flaps 43 and close them. When the pressing piston 10 moves upwards, the braking mechanisms 49 press against the upper bumper supports 48 to similarly cause the pipes to lug the rods in the opposite direction and thus open up the cover flaps 43 of the pressing piston 10.

The leaves fall into the machine through the chute 8, where the flap valve 9 changes the angle of falling of the leaves in order to spread them uniformly in the cart 5. The leaves pass through the pressing piston 10, when the piston is moving upward and its cover flaps 43 are opened, and fall uniformly to spread in a layer over the movable bottom 4. Each layer of leaves is pressed by the pressing piston 10 moving downward with its cover flaps closed, and the movable bottom 4, supported by the piston rod 3a of the lower hydraulic cylinder 2, is forced downwards a distance equal to the thickness of the layer of leaves pressed by every down stroke of the pressing piston. This downward movement of the movable bottom displaces fluid under the piston 3 of the lower hydraulic cylinder 2 through the valve 18 into the upper hydraulic cylinder-reservoir 17, raising at the same time the piston 20 of the cylinder upwardly. The pressing force exerted on the leaves is thus the same for each layer of leaves and is the pressure required to force the fluid from the lower hydraulic cylinder 2 through the valve 18 into the upper hydraulic cylinder 17. This pressure is adjustable between wide limits by changing the bias of spring 34 as provided by the construction and the operation of the valve 18 as described below.

For the liquid to pass from the lower hydraulic cylinder 2 into the upper hydraulic cylinder-reservoir 17, the openings a and b of the valve 18 must be connected one with another. Liquid from cylinder 2, fed through the opening a, acts upon the differential piston 19. Because of the larger cross-section area of the upper part of piston 19 as compared with lower part, the piston 19 is displaced upwards against the bias of the spring 34, to connect the openings a and b. The pressure of the fluid entering the valve 18 must be such, as to produce a force large enough to deflect the spring 34. Changing of the bias of the spring 34 is done by manually turning knob 36 and the screw to displace the nut 37 and engaged pressing disc 35, and thereby, the pressure that can be exerted by pressing piston 10 on the leaves in the cart supported by its bottom raised by piston 3. By this adjustment for varying pressing pressure, various grades of leaves can be formed respectively into bales of the same height and weight in the machine, the necessary pressure being set as indicated by the pressure gage. On the upward stroke of the piston 10, the pressure on the leaves, and in the hydraulic cylinder 2, and opening a of valve 18 falls, and the spring 34 returns the differential piston 19 to its lower position disconnecting openings a and b and preventing the return of the liquid from the upper hydraulic cylinder 17 to the lower hydraulic cylinder 2. An opening is drilled through the entire length of the differential piston 19 for the purpose of equalizing the pressure and preventing air locks at both ends.

As soon as the bale is made, i.e. when the bale reaches its standard height, the movable bottom 4 has reached its lower full-container position. At that point the movable bottom 4 compresses the springs 24, and the piston rod 3a of the lower hydraulic cylinder 2 contacts the electrical cut-off device 27 which stops the flow of the tobacco leaves through circuits and mechanism not shown. At the same time an electrical relay (not shown) is switched on for a period of time sufficient for the pressing piston to reciprocate several times, in order to form completely the bale and then automatically cuts off the electrical motor 16 of the machine. The relay operation is adjusted so that the machine stops when the pressing piston 10 is clear of the cart 5 so that it does not interfere with removal of the cart 5 from the machine. A counterweight 58 of the crank 13 prevents the pressing piston from moving downwards by gravity. The electrical cut-off device 27 is provided for ensuring the cut-off of electrical power circuit when the cart 5 is full.

After stopping of the machine, the cart 5 is unlocked by hand and it is rolled out of the machine. At the same time the movable bottom 4 is slightly lifted by the action of the springs 24 so that cart 5 can be removed from the machine without frictional contact with the piston rod 3a of the lower hydraulic cylinder 4.

The release of the cart 5 from the locking mechanism of the chute is accomplished by pushing either of the levers 56 to raise the associated cross-shaped tongue 53 and the cart 5 is released for travel in the released direction. The back inner wall of the cart passes under the cross-shaped tongue 53 camming it upward by means of the back slope.

A new, empty box-carriage is brought into the machine and the operation cycle is repeated, as described above.

Although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What we claim and desire to secure by Letters Patent is:

1. An improved leaf baling machine comprising, in combination, a cart having a bottom movable vertically between an upper empty position and a lower full position, leaf feeding means having a vertical lower section for feeding leaves into said cart, locking means for releasably locking said cart in position to receive leaves delivered to said vertical lower section of the leaf feeding means, a pressing piston having bottom cover flaps pivotally mounted thereon so as to be movable between an open position providing a vertical passageway through said piston, and a closed position for pressing leaves in said cart, said piston being mounted to vertically reciprocate in said vertical lower section of the leaf feeding means, said piston being movable to its lowermost position with the cover flaps in their closed position, driving means for reciprocably driving said pressing piston vertically in timed reciprocating motion, linkage means connecting said bottom cover flaps of said pressing piston to said driving means and including means relatively movable for closing said cover flaps on the down stroke of said piston and for opening said flaps on the upstrokes of said piston, hydraulically operated supporting means for movably supporting said movable bottom between said upper empty and lower full positions, control means comprising means for selectively controlling said supporting means manually in moving the movable bottom from said lower full position to said upper empty position, said control means including means operated by pressure of the downstrokes of said pressing pistons for controlling movement of said movable bottom from said upper empty position to said lower full position in successive steps, said control means including means adjustable to provide for the successive displacements downward of said supporting means when a selected pressing piston pressure is reached during each downstroke of said piston, whereby a layer of leaves from the leaf feeding means fed into said cart through said pressing piston with its cover flaps open on each up-stroke is compressed by said pressing piston with its cover flaps closed on each down-stroke and said movable bottom is displaced on each downward stroke a distance equal to the compressed layer of leaves admitted in the previous up-stroke and said layers are of substantially the same density.

2. An improved leaf baling machine according to claim 1 comprising, an adjustable flap valve mounted above said vertical lower section in said leaf feeding means for controllably causing said leaves to be spread uniformly in said cart.

3. An improved leaf baling machine according to claim 1, in which said driving means comprises, an electric motor, a speed reduction device driven by said electric motor, a crank rotatably driven by said reduction device, a cross head driven in vertical reciprocatory movement by said crank, and a counterweight mounted on said crank diametrically opposite to said crosshead to ensure the crosshead is not moved by gravity and means connecting said crosshead with said piston.

4. An improved leaf baling machine according to claim 1, in which said linkage means comprises piston rods connecting said driving means to said pressing piston, a pipe slidably mounted on each said piston rod, connecting rods pivotally connected to the lower end of a respective one of said pipes, the other ends of said connecting rods being pivotally connected to the respective cover flaps of said pressing means, and means comprising upper and lower stops and means respectively mounted on each said pipe intermediate its ends for engaging said upper and lower stops as said driving means drives said pressing piston reciprocably, vertically, for causing said pipes to move relative to said piston rods to open and close said flaps respectively as said pressing piston is driven vertically up and down.

5. An improved leaf baling machine as described in claim 1, in which said hydraulically operated supporting means comprises a hydraulic cylinder mounted under the position of said cart when locked to the lower section of said leaf feeding means, and a piston slidably mounted in said cylinder and engageable with the movable bottom of said cart to movably support said movable bottom between its lower full and upper empty positions as hydraulic fluid is added to or withdrawn from said cylinder.

6. An improved leaf baling machine according to claim 5, in which said control means comprises a reservoir cylinder containing liquid, a piston slidably mounted in said reservoir cylinder weighted to exert a pressure on the liquid in said reservoir cylinder, and flow means connecting said reservoir cylinder and said hydraulic cylinder including valve means for controlling the flow of liquid from said reservoir cylinder to said hydraulic cylinder manually and controlling the flow of liquid from said hydraulic cylinder to said reservoir cylinder automatically in response to a selected pressure exerted by said pressing cylinder on each down stroke of its vertical reciprocatory motion.

References Cited in the file of this patent

UNITED STATES PATENTS

| | | |
|---|---|---|
| 280,478 | Hunter | July 3, 1883 |
| 1,707,314 | Towler | Apr. 2, 1929 |
| 2,732,113 | Rice | Jan. 24, 1956 |
| 3,046,873 | Landis | July 31, 1962 |

FOREIGN PATENTS

| | | |
|---|---|---|
| 516,031 | Germany | Jan. 16, 1931 |
| 881,404 | France | Jan. 22, 1943 |